(No Model.) 2 Sheets—Sheet 1.
A. A. GUICHARD.
MACHINE FOR BREAKING STALKS.
No. 448,230. Patented Mar. 17, 1891.
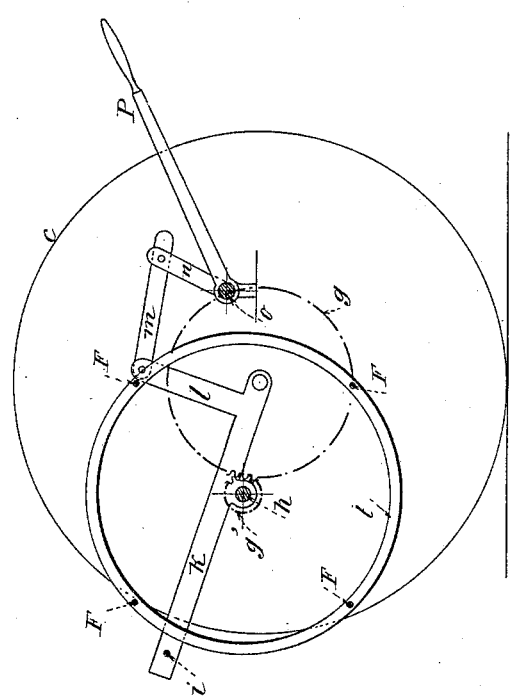
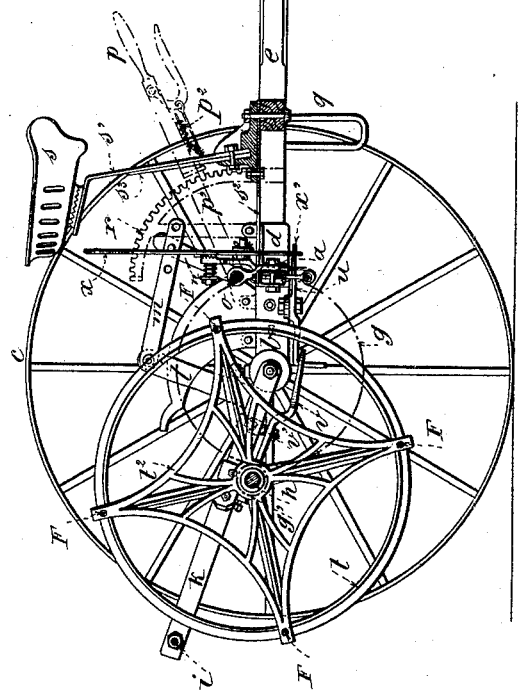
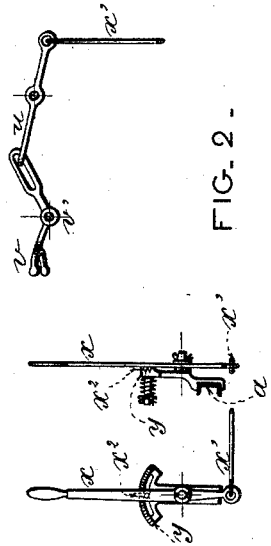
Witnesses:
Alphonse Bletry
Paul Ruby
Alexandre Guichard
Inventor (No Model.) 2 Sheets—Sheet 2.
A. A. GUICHARD.
MACHINE FOR BREAKING STALKS.
No. 448,230. Patented Mar. 17, 1891.
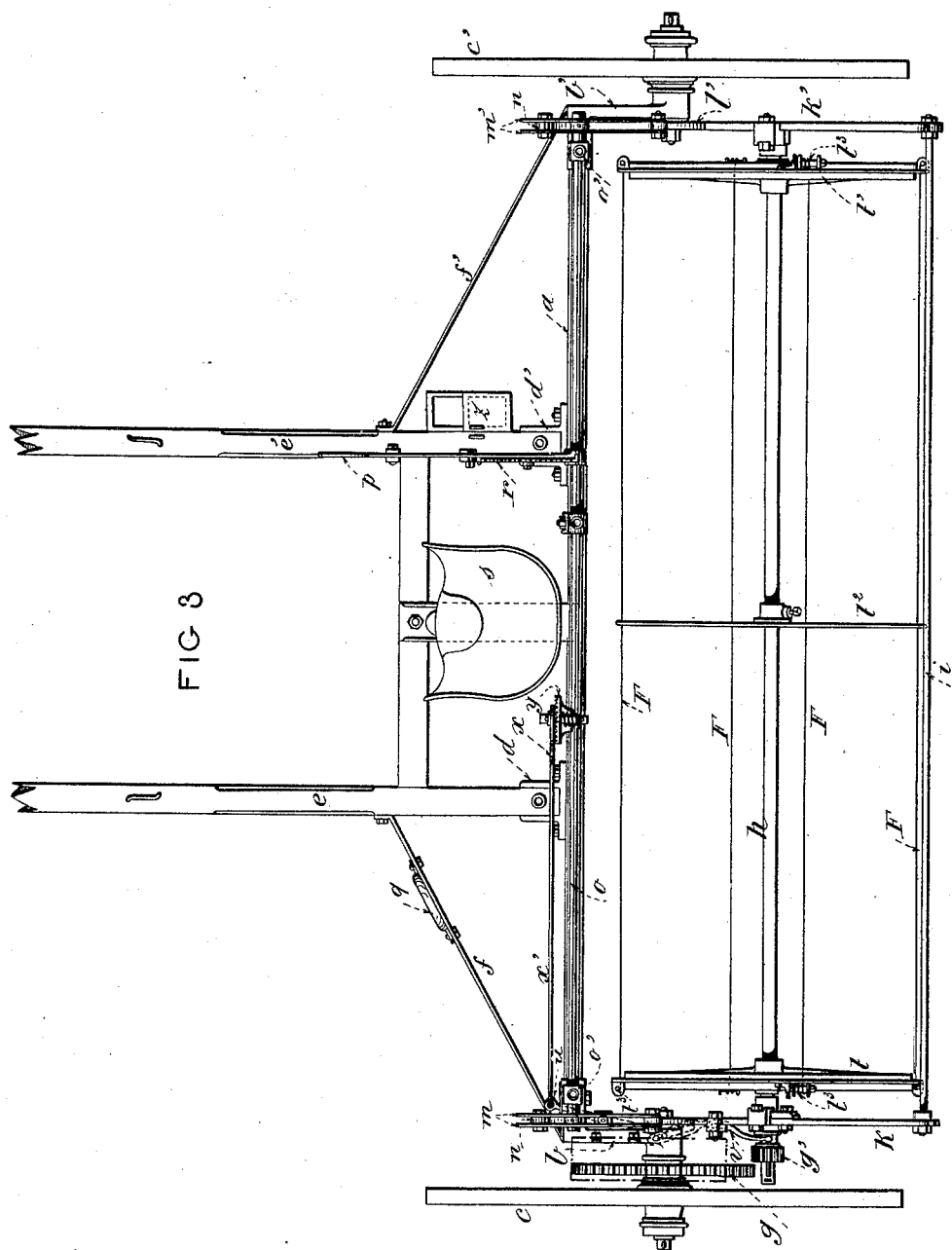
Witnesses:
Alphonse Blétry
Paul Ruby
Alexandre Guichard
*Inventor*

UNITED STATES PATENT OFFICE.

ALEXANDRE ABEL GUICHARD, OF LIEUSAIND, FRANCE.

MACHINE FOR BREAKING STALKS.

SPECIFICATION forming part of Letters Patent No. 448,230, dated March 17, 1891.

Application filed December 6, 1888. Serial No. 292,781. (No model.) Patented in France June 22, 1887, No. 184,381.

*To all whom it may concern:*

Be it known that I, ALEXANDRE ABEL GUICHARD, of the firm Pillier & Guichard, a citizen of the Republic of France, residing at Lieusaind, Department of Seine-et-Marne, France, have invented a new or Improved Machine for Breaking or Cutting Off Wild Mustard or other Similar Pernicious Plants in Agricultural Crops, (for which I have obtained Letters Patent in France, dated June 22, 1887, No. 184,381;) and I do hereby declare that the following is a full, clear, and exact description of the invention, which will enable others skilled in the art to which it appertains to make and use the same, reference being had to the accompanying drawings, and to the letters of reference marked thereon, which form a part of this specification.

The object of this invention is to destroy or remove the wild mustard or charlock or other similar pernicious plants or weeds, which often grow in great strength and abundance in certain agricultural crops—such as in oats, for example—and seriously hinder the growth of such crops.

The machine forming the subject of this invention breaks or divides the stems of the plants or lops off their heads, so that their growth is ultimately stopped and their seeds prevented from forming, so that they are no longer found among the harvested grain, and are not spread over the ground to reappear in the sowing of the following year.

Figure 1 of the drawings hereto annexed is a diagram showing the principle on which my invention is based. Fig. 2 is a sectional elevation of a machine constructed in accordance with that principle, said section being taken on the line 1 2 of Fig. 3. Fig. 3 is a plan of the said machine. Figs. 4 and 5 show in front and side view, respectively, the details of the lever for putting the machine in and out of gear with one of the bearing or carrying wheels of the machine; and Fig. 6 is a plan view showing details of the connections which are actuated by the lever shown in Figs. 4 and 5, in order to effect the engagement of the machine with and disengagement of the same from the carrying-wheel.

A main cross-piece or transom $a$ of channel-iron carries at right angles to its ends the pieces $b\ b'$, terminating in enlargements in which are fixed the axles of the supporting or carrying wheels $c\ c'$. To the transom $a$ are bolted the boxes or sockets $d\ d'$, which receive the ends of the horse-shafts $e\ e'$. Stay-bars $f\ f'$ unite these shafts firmly to the ends of the transom. On the nave of one of the carrying-wheels $c$, for example, is fixed the spur-wheel $g$, which drives a pinion $g'$ on the shaft $h$. The shaft $h$ is arranged parallel to the transom $a$ in two iron arms $k\ k'$, which pivot on the inner ends of the axles of the wheels $c\ c'$ and are connected together behind by a long cross-bar $i$. In front these arms are provided with other arms $l\ l'$, which stand at right angles thereto and are connected by links $m\ m'$ with levers $n\ n'$, which are fixed on the ends of a transverse shaft $o$, operated by a lever $p$. As seen in Fig. 3, this lever is placed to the right of the driver, and its shaft $o$ turns in bearings $o'\ o'$, bolted to the main transom $a$. The shaft $h$ can be raised or lowered at pleasure by means of the lever $p$, and with it the cutting or breaking part of the apparatus. When the proper position of the lever $p$ is determined, it is fixed in a corresponding tooth of the sector $r$ by means of the pawl $p'$, actuated by the spring $p^2$. The sector $r$ is secured to the horse shaft $e'$ and to a lug on the box or socket $d'$.

The driver is seated on the seat $s$, which is carried above the shafts $e\ e'$ by an iron standard $s'$, bolted to a cross-piece $s^2$, fixed to the said shafts. A spring-blade $s^3$ bears against the iron standard $s'$ and gives a certain amount of elasticity to the seat. The stay-bar $f$ is furnished with a stirrup $q$ to aid the driver in mounting and dismounting to and from the seat.

The cutting or breaking apparatus consists of the shaft $h$, of two cross-barred rings $t\ t'$, fixed on the ends of the shaft $h$, and of a third set of cross-arms $t^2$, also fixed on the shaft $h$ in the center line of the machine. The two cross-barred rings $t\ t'$ serve to stretch a certain number—four, for example—of wires or blades F, of steel, iron, or other suitable metal, by the aid of any suitable tighteners $t^3$. The intermediate cross-arms $t^2$ are intended to support the metallic wires F and to prevent them from whipping during the rapid rotary movement of the cutting or breaking apparatus. The pinion $g'$ on the end of the shaft $h$ is adapted to slide longitudinally on this shaft in order to connect or disconnect the same with the toothed wheel $g$, but is prevented from turning on the said shaft by means of a feather. The said pinion is in one piece with a collared sleeve, which is embraced by the fork of a lever $v$ oscillating on an axis $v'$, fixed to the arm $k$. The lever $v$ is actuated by another lever $u$, connected with the tension-rod $x'$, which is in turn connected to a lever $x$, placed to the left of the driver and held in place by a tooth $x^2$, with which it is provided, entering the teeth of a fixed sector $y$, Figs. 4 and 5. A tool-box $z$ is fixed at the side of the horse-shaft $e'$ to contain various tools, oil-cans, &c.

*Action of the machine.*—According as the charlock or other plant it is desired to cut off or break is more or less high, the shaft $h$ is raised or lowered by means of the lever $p$, so as to bring the wires or blades F into position to act upon the plant. The pinion $g'$ is put in gear with the spur-wheel $g$ by means of the lever $x$ and connections $x'$, $u$, $v'$, and $v$. If now the machine is drawn along on the wheels $c\ c'$, the spur-wheel $g$ communicates a rapid rotary motion to the shaft $h$ by means of the pinion $g'$, and the wires or blades F, stretched between the rings $t\ t'$, mow, break, or lop off all the stalks of mustard or charlock which come within the range of the said wires or blades as they revolve. The consequence is that the charlock or other pernicious plant is prevented from bearing seed which could be mixed with the oats or other crop, and the ground is prevented from receiving such seed, since the plant itself has been attacked and destroyed before maturity.

I claim—

1. The herein-described cutting or breaking off machine, which consists, essentially, of one or more wires F, stretched between plates or rings $t\ t'$, secured on a shaft $h$, which can be raised or lowered at pleasure between the carrying-wheels $c\ c'$ by means of a lever $p$, and which is set in rotary motion by gearing operated by one of the said carrying-wheels as the machine is moved along, substantially as hereinbefore described.

2. In a stalk-cutting machine, the combination, with the wire-carrying shaft $h$ and the carrying-wheels $c$, of means for connecting and disconnecting said shaft from one of said wheels $c$, which consists of the spur-wheel $g$, fixed to the carrier-wheel $c$, the pinion $g'$, sliding on the shaft $h$, the forked lever $v$, the lever $u$, the rod $x'$, and the lever $x$, combined, arranged, and operating substantially as hereinbefore described.

3. In a machine for cutting or breaking off the stalks of wild mustard or other pernicious plants, the apparatus for raising or lowering the cutting or breaking off devices to suit the height of the plant, consisting of the lever $p$, the shaft $o$, the arms $n\ n'$, links $m\ m'$, arms $l\ l'$, and arms $k\ k'$, combined, arranged, and operating substantially as hereinbefore described.

In witness whereof I have hereunto set my hand in presence of two witnesses.

ALEXANDRE ABEL GUICHARD.

Witnesses:
 R. J. PRESTON,
 ALPHONSE BLIVEN.